United States Patent [19]
Salvati et al.

[11] 3,780,355
[45] Dec. 18, 1973

[54] METAL ENCLOSED SWITCHGEAR WITH J-SHAPED VERTICALLY DISPOSED CONDUCTORS

[75] Inventors: John G. Salvati; Louis N. Ricci, both of Beaver Falls; Carl R. Merola, Monroeville, all of Pa.

[73] Assignee: Westinghouse Electric Corporation, Pittsburgh, Pa.

[22] Filed: Jan. 17, 1973

[21] Appl. No.: 324,263

[52] U.S. Cl. .............................. 317/120, 174/72 B
[51] Int. Cl. ............................................. H02b 1/20
[58] Field of Search .......................... 317/117, 120; 174/70 B, 71 B, 72 B

[56] References Cited
UNITED STATES PATENTS
3,493,818  2/1970  Paape ................................ 174/71 B
2,997,627  8/1961  Ellegood .............................. 317/117

*Primary Examiner*—J. R. Scott
*Assistant Examiner*—Gerald P. Tolin
*Attorney*—A. T. Stratton et al.

[57] ABSTRACT

Each section of a three-phase metal-enclosed switchgear unit is provided with main through horizontal bus and generally J-shaped vertical section bus. The J-shaped vertically extending risers are connected to the horizontal main through bus, and feed circuit breakers or other branch bus circuit controlling devices mounted in the switchgear unit. A small section of the J-shaped bus is turned around and butt welded to the back of the J-shaped vertical section bus, where a connection to the main through horizontal bus is desired.

8 Claims, 6 Drawing Figures

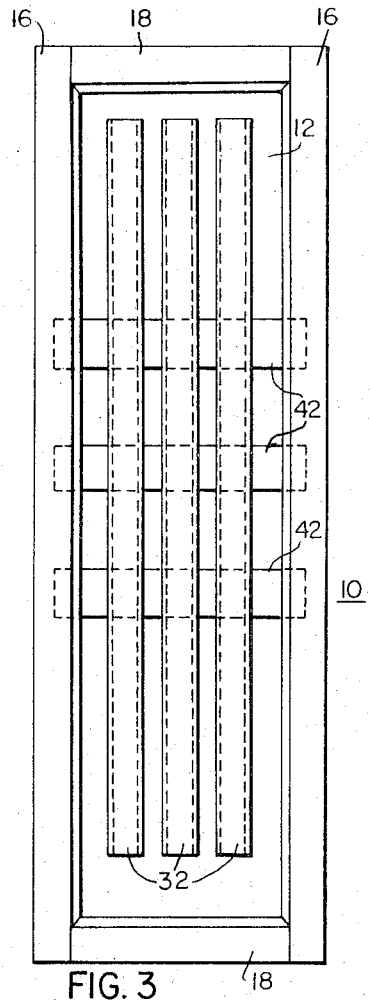
FIG. 3
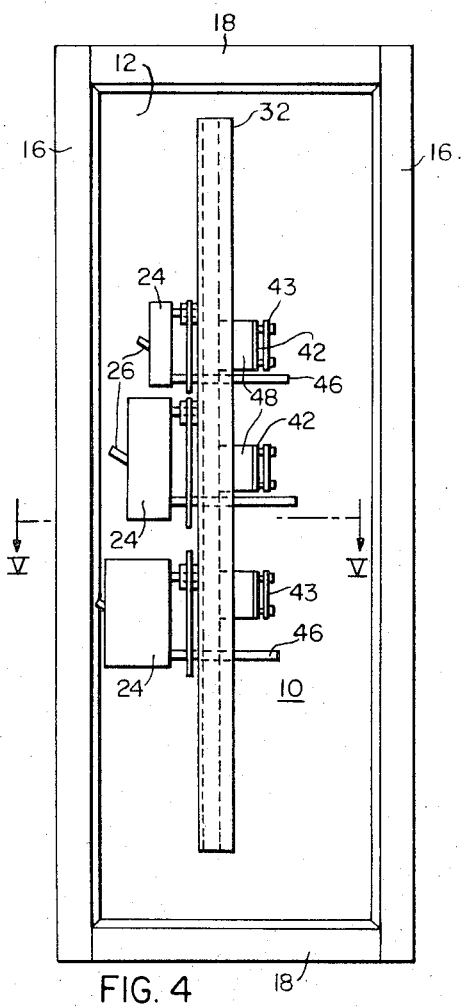
FIG. 4
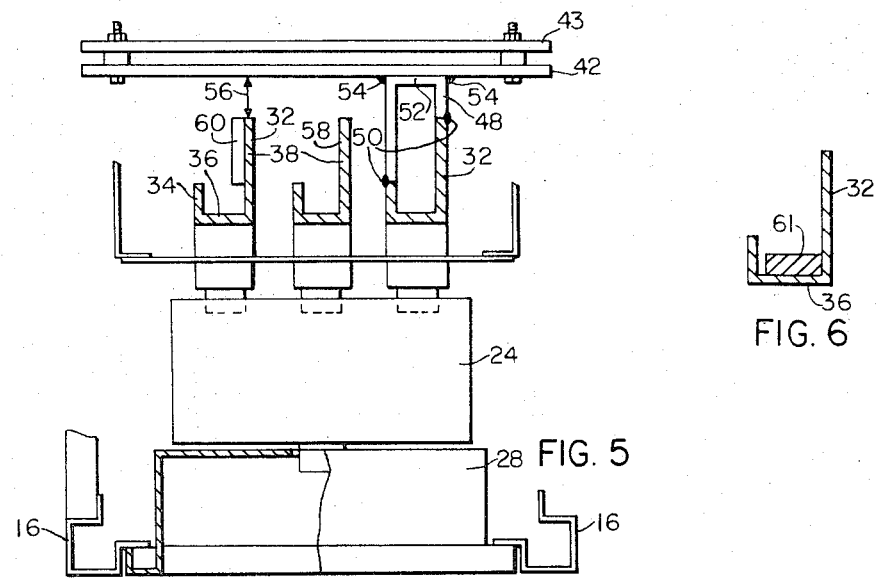
FIG. 5
FIG. 6

METAL ENCLOSED SWITCHGEAR WITH J-SHAPED VERTICALLY DISPOSED CONDUCTORS

BACKGROUND OF THE INVENTION

This invention relates generally to switchgear and more particularly to metal-enclosed switchgear of a type suitable for relatively low voltage power distribution service. More specifically, this invention relates to the through and vertical bus forming a part of such metal-enclosed switchgear unit.

A metal-enclosed switchgear installation usually includes one or more units with each unit consisting of a plurality of sections or cells. The sections are assembled side by side to provide a unit or switchgear assembly capable of housing a desired number of circuit breakers or other circuit controlling devices. The maximum number of sections assembled in a unit at a factory is usually governed by the handling and shipping facilities available. The associated main through horizontal bus conductors and the vertical riser conductors are electrically connected at one or more points. For economic reasons, it is desirable that the amount of through horizontal bus, vertical section bus, branch bus, load side extensions and interconnecting conductors be kept to a minimum. This can best be achieved by having the horizontal through bus, for each phase of a three phase system, spaced apart in a vertical plane, behind the vertical section bus. It is also desirable to have an easy and economic means of connecting the horizontal through bus to the vertical section bus.

Each switchgear section comprises a structural framework and a formed sheet metal enclosure. Each switchgear unit generally has a breaker compartment at the front, a cable compartment at the rear and a bus or conductor compartment between the cable compartment and the breaker compartment. The breaker compartment can be divided into a plurality of individual enclosures for housing circuit breakers or other circuit controlling devices. The bus compartment contains main through bus bars and vertical riser conductors or vertical section bus to which the branch bus and individual circuit breakers are connected. Load side conductors extend from the circuit breakers past the vertical bus, through the bus compartment and terminate in the cable compartment at the rear of the switchgear cell. In order to keep the length of the load side conductors to a minimum, it is desirable that the depth of the bus compartment be kept as small as is practical. Cables which supply the various load or feeder circuits with electric power are connected to the load side conductors when the switchgear unit is installed in service.

With increased system capacity and the higher available short circuit current, it is important that electrical conductors be constructed and positioned to withstand high magnetic forces. Under short circuit conditions where high fault currents produce electromagnetic forces of a large magnitude between conductors, it is especially important that the through bus and section bus be so constructed as to withstand these forces.

SUMMARY OF THE INVENTION

In accordance with the invention, a metal-enclosed switchgear unit is provided with main through horizontal bus conductors and J-shaped vertical section bus conductors. The main through bus comprises flat bus bars having their longitudinal axis extending in a horizontal direction, with each phase being separated from the bus bar of the other phases by a vertical space. The phases of the horizontal through bus are positioned in a spaced apart relationship, with the bus bar width axis of all phases lying in a generally vertical plane. That is the bus bars of each phase are positioned in an edge to edge spaced apart relationship with the bus bars of the other phases. The vertical space between the edges of the bus bar conductors is large enough, such as 1 ½ to 2 times bus bar width, to greatly reduce short circuit magnetic forces.

The vertical section bus conductors are disposed in front of the main through horizontal bus a sufficient distance to maintain the required through air clearances. The phases of the vertical bus conductors are separated also by sufficient distance to maintain their required phase to phase through air clearances. The J-shaped vertical section bus is disposed in the switchgear unit, with a flat surface facing the front of the switchgear section and a long and a short leg extending from the respective opposite sides of the flat surface towards the rear of the switchgear section. To join the J-shaped vertical section bus to the horizontal main bus, a short section of J-shaped bus is turned around and butt welded to the back of the vertical bus. The length of this J-shaped connector is approximately equal to the width of the bus bars, used for the main through bus, to which the vertical bus is connected. The J-shaped connector and the J-shaped vertical bus have the same cross-sectional area, and when formed from aluminum can be made with the same extrusion die. Thus, the same J-shaped conductor can be used for the J-shaped vertical section bus and the J-shaped connector between the vertical section bus and the main through bus. The short leg of the J-shaped connector is welded to the long leg of the J-shaped vertical section bus and the long leg of the J-shaped connector is welded to the short leg of the vertical section bus. This provides both the necessary contact area for connecting to the main bus and the required through air clearance between the main through bus and the vertical section bus of different phases. The required through air clearance dimensions between the vertical section bus and the main horizontal through bus determine the minimum length of the short leg of the J-shaped cross-section conductor. Due to the normal required current carrying capability of the vertical section bus the long leg of the J-shaped section is usually at least twice as long as the short leg of the J-shaped section.

The J-shaped vertical section bus provides a flat surface of minimum width facing the front of the switchboard, to which circuit breakers and other circuit interrupting or controlling devices can easily be attached. In mounting the individual circuit interrupting devices to the J-shaped vertical section bus, the line side connectors coming off the circuit interrupter are bolted to the vertical section bus. When making bolted joints, some minimum contact area under pressure must be maintained in order to minimize heat generation and hot spots. Therefore the flat surface to which the circuit interrupters are attached have a flat surface of minimum width facing the front of the switchboard. This flat surface has a maximum width restriction due to the space confines of metal-enclosed switchgear. The depth of the vertical section connection to the main through bus must be kept minimal because as the vertical bus becomes further spaced from the main through bus, all the breaker load side connectors, which extend past the vertical section bus into the cable compartment of the switchboard, increase in length.

The cross-sectional area of the J-shaped vertical bus has a relatively high section modulus which provides good strength and prevents deformation under high short circuit current conditions. The J-shaped vertical section bus also lends itself to the addition of flat bus bars, along the long leg of the J-shaped section, for increasing the ampacity of the vertical bus. Additional flat bars can be added inside the J-shaped vertical bus along the long leg so as to increase the current rating of the vertical bus without increasing any outside physical or structural dimensions of the vertical bus. Using a J-shaped section with one relatively short leg provides easy access to the back of the flat front surface to which circuit interrupting units are attached. This easy access facilitates assembly of circuit interrupting devices to the vertical section bus, and simplifies maintenance when required.

BRIEF DESCRIPTION OF THE DRAWINGS

For a better understanding of the invention, reference may be had to the preferred embodiment exemplary of the invention shown in the accompanying drawings, in which:

FIG. 3 is a front view of a single switchgear section;

FIG. 4 is a side view of a switchgear section showing some molded case circuit breakers mounted to the J-shaped vertical risers;

FIG. 5 is a section view of the switchgear section shown in FIG. 4 along the lines V—V; and FIG. 6 is a top section view of one of the J-shaped verticals shown in FIG. 5, illustrating an alternate location for additional bus conductors.

DESCRIPTION OF THE PREFERRED EMBODIMENT

Figure 1:
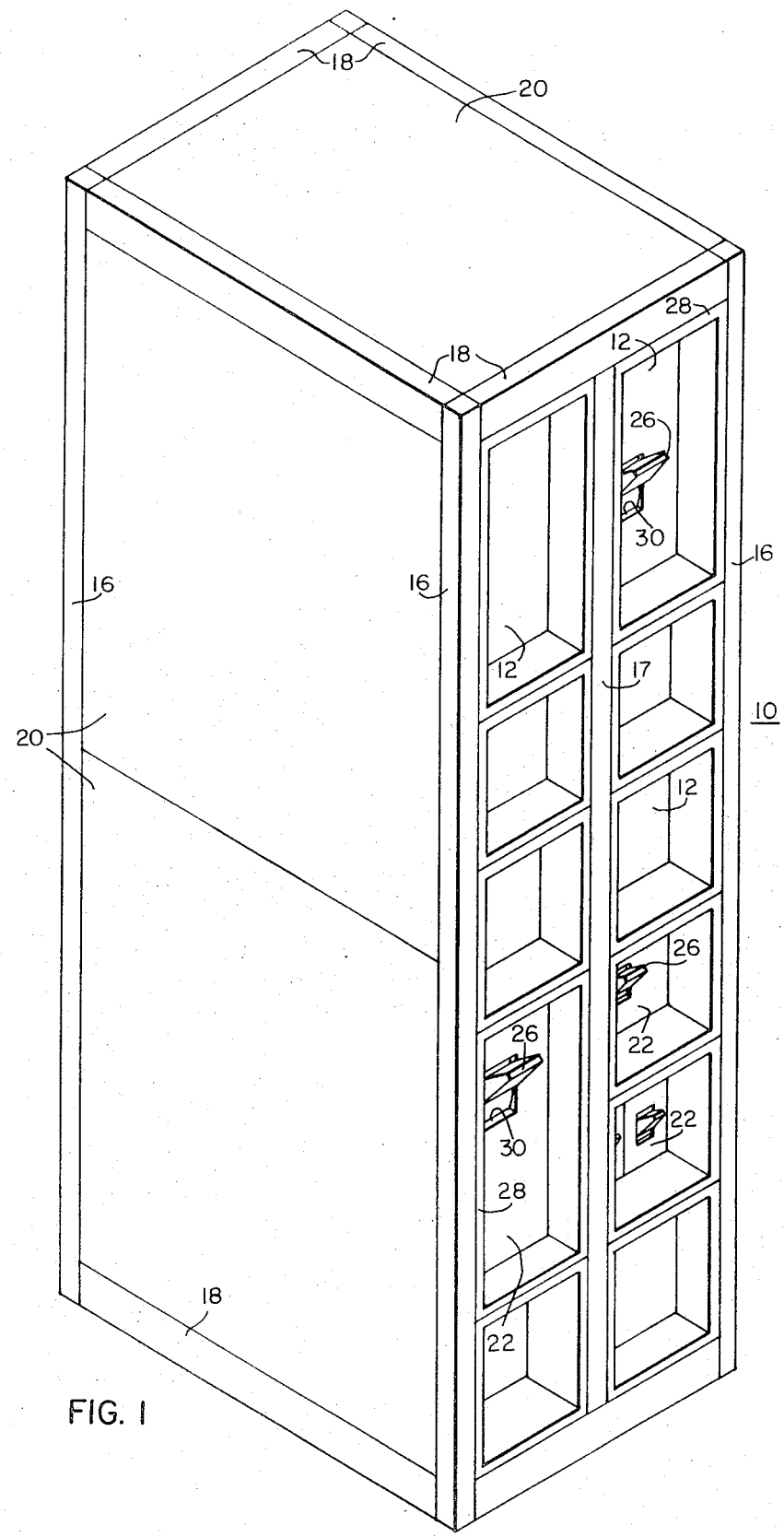
FIG. 1 is a perspective view of a double section switchgear unit.

Referring now to the drawings and to FIG. 1 in particular, there is shown a switchgear unit or assembly 10 comprising two generally rectangular upstanding sections or cells 12 disposed in side-by-side relationship. Additional cells may be added as desired. Generally, each switchgear unit comprises structural members 16, 17 and 18 to which formed cover sheets 20 are added. The front portion of each switchgear section 12 is divided into smaller enclosures 22 for various circuit controlling apparatus. These enclosures 22 are vertically stacked or disposed one below the other for the height of the switchgear section 12. As shown in FIGS. 1 and 4, when molded case circuit breakers 24 are mounted in the swtichgear section 12, the front of each of the circuit breakers 24 is set back from the front of the switchgear section 12. The operating handles 26 of the molded case circuit breakers 24 are also recessed from the front of the switchgear unit 10. Covers 28 which attach or are secured to the vertical structure members 16 and 17 form a part of the front face of switchgear unit 10. Circuit breaker operating handles 26 project through openings 30 formed in the front covers 28. The breaker handle 26 is thus set back from the front of the switchgear unit 10 in a shallow well or cover 28, and is at least partially protected from material or personnel moving across the front of the switchgear unit 10.

Figure 2:
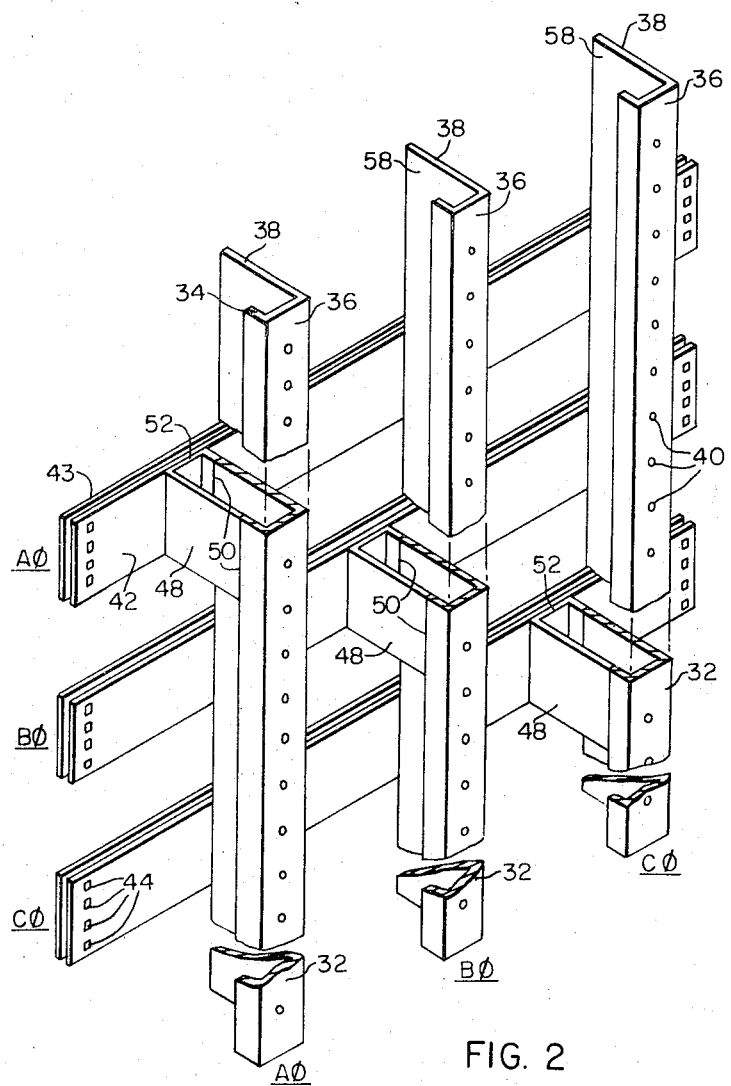
FIG. 2 is a perspective view of the horizontal through bus and the J-shaped vertical bus for one section of a switchgear unit.

Each switchgear section 12 comprises three J-shaped vertical section bus members 32 as shown in FIGS. 2 and 3. The J-shaped section bus 32 comprises a short leg section 34, a flat surface 36 extending perpendicular to the short leg 34 and a long leg section 38 attached to the other end of the flat surface 36 and extending perpendicularly thereto in the same direction as the short leg 34. The J-shaped vertical riser generally comprises a bight portion 36, a first short leg portion 34 extending rearward in close proximity to one edge of the bight portion 36. The front of flat surface 36 faces the front of the switchgear section 12. Each switchgear section 12 comprises three J-shaped vertical bus conductors or members 32, one for each phase of a three-phase system. A plurality of holes 40 is formed in the flat surface 36 of each J-shaped bus 32 to facilitate attachment of circuit breaker 24 or other circuit controlling devices to the J-shaped vertical bus. The plurality of holes 40 is evenly or uniformly spaced along the flat surface 36.

As shown in FIGS. 3, 4 and 5, the main through bus 42 extends horizontally in the switchgear unit 10. Additional bus bars 43 can be added to each phase of the horizontal through bus 42 until the desired current rating is obtained. These additional bus bars 43 for each phase of the switchgear unit 10 are added in a front-to-back spaced apart relationship and are disposed generally parallel to the bus bars 42. The longitudinal axis of the main through bus 42 is disposed in a generally horizontal direction while the width axis of each phase of the main through bus lies generally in a common vertical plane. Vertical spaces separate the three phases of the main through bus 42. The ends of the main through bus 42 have openings 44 formed therein to facilitate attachment or connections to additional switchgear sections 12, when desired as shown in FIG. 2.

Each J-shaped vertical section bus conductor or riser 32 is located in the front of through bus 42 with the flat surface 36 facing the front of the switchgear section 12, and the long leg 38 and the short leg 34 facing the through bus 42. The three vertical section bus conductors 32 extend parallel to each other in a vertical direction, with the front flat surfaces 36 of the J-shaped sections 32 lying in a common vertical plane. A plurality of circuit breakers 24 and other circuit controlling devices can then be easily attached to the front of flat surfaces 36. The flat surface 36 of each bus conductor 32 is made wide enough so that good contact, with adequate contact area and acceptable temperature rise, can be made between the largest circuit breaker 24 to be used and the vertical J-shaped section bus 32.

The J-shaped vertical section bus 32 must be electrically and structurally connected to the horizontal through bus 42. It is desirable that the J-shaped vertical section 32 be kept close to the horizontal through bus 42 so as to reduce the length of the load side extensions 46 projecting from circuit breakers 24. As shown in FIGS. 4 and 5, circuit breakers 24 are electrically connected to the front flat surface 36 of the J-shaped bus 32. Load side extensions or conductors 46 extend from the load terminals on each circuit breaker 24 between the vertical section bus 32 to a point at the rear of the switchgear section 12, where load cables can easily be attached. A compact J-shaped section bus 32 and horizontal through bus 42 assembly permits shorter lead side extension to be used, with resulting savings in conductor costs.

Each J-shaped section conductor 32 lends itself to simple and enexpensive connection to the main through bus 42. A connector 48 having the same corss-section as the J-shaped vertical bus 32 can be used for connecting each J-shaped vertical bus 32 to the main horizontal through bus 42. As best shown in FIGS. 2 and 5, each J-shaped connector 48 can be butt welded to the associated J-shaped vertical section bus 32 at points 50. This construction provides a flat surface 52 facing the rear of the switchgear unit 10 to which the main horizontal through bus 42 can be easily attached or connected. The short leg of the J-shaped connector 48 is welded to the long leg 38 of the J-shaped section bus 32 while the long leg of the J-shaped connector 48 is welded to the short leg 34 of the J-shaped section bus 32. The horizontal through bus 42 can be attached to flat surface 52 of the J-shaped connector 48 by suitable means, such as welding or bolting. In the embodiment shown in FIG. 5, the J-shaped connector 48 is welded to the J-shaped vertical section bus at points 50. The J-shaped connector 48 is welded to the main through conductors 42 at point 54. The maximum length of the J-shaped connector 48 is determined by the width of the bus bars used for the horizontal through bus 42. As shown in FIG. 2, surface 52 can be as long vertically as the main through horizontal bus 42 is wide. As shown in FIG. 5, a minimum spacing or clearance indicated by arrow 56 is required between the end of the long leg 38 of the J-shaped vertical section bus 32 and the horizontal through bus 42 of another phase. This minimum spacing 56 determines the length of the short leg 34 of the J-shaped vertical section bus 32. By making the short leg 34 equal to the minimum required spacing 56, the same stock part can be used for the J-shaped connector 48 and vertical J-shaped section bus 32. Using the same stock item for the J-shaped connector 48 and the J-shaped vertical bus 32 lowers the necessary number of different inventory parts and helps reduce the overall cost of the switchgear unit 10. It is desirable to keep the length of leg 34 as short as possible while still meeting the minimum spacing requirement indicated by arrow 56 so as to allow easy access to the back of flat surface 36. By keeping leg 34 short, easy access can be had to the back surface of flat surface 36 to facilitate assembly and maintenance of the switchgear unit 10.

The J-shaped section conductors 32 provide more surface area than a rectangular bar of the same cross-sectional area and size limitations. This increases current capacity and provides for good heat dissipation. The J-shaped cross-sectional vertical conductor 32 also has a relatively high section modulus which provides good strength and helps prevent deformation under short circuit conditions.

The inside surface 58 of long leg 38 provides an easily accessible area to which vertically disposed rectangular bars can be attached to increase the current rating of the vertical section bus 32. As shown in FIG. 5, a rectangular bar 60 can be added to surface 58 to increase the continuous current ampacity of the vertical section bus 32, when desired. The rectangular vertically disposed bus bar 60 can be attached to the J-shaped vertical section bus 32 by suitable means, such as welding or bolting. Referring now to FIG. 6, there is shown an alternate location for an additional bus bar 61, to increase the ampacity of vertical section bus 32.

The additional bus bar 61 can be added to the back of the bight portion 36 of J-shaped vertical section bus 32 by suitable means, such as welding or bolting.

Under a J-shaped vertical section bus 32 and a J-shaped connector 48 in the construction of a switchgear unit 10 has several advantages, such as, a reduced number of required stock inventory items and a simple, inexpensive connection means to the main through bus 42. This construction also provides a compact bus bar arrangement. The J-shaped vertical section 32 can withstand high short circuit currents without damage and provides an easily accesible flat surface 58 to which additional conductors can be attached for increased current carrying ratings. Also, since leg 34 is relatively short, the back of the flat mounting surface 36 is easily accessible for assembling and maintenance.

We claim:

1. A metal enclosed switchgear unit comprising:
   a generally rectangular section structure;
   three horizontally extending main through bus bar conductors disposed horizontally in a spaced apart relationship in said rectangular section;
   three vertical risers disposed in said rectangular section in front of said main horizontal through bus bar conductors;
   connector means electrically connecting each phase of said horizontal main through bus conductor to its associated vertical riser; and
   each of said vertical risers comprising a bight portion having a front facing flat surface, a first short leg portion extending rearwardly in close proximity to one edge of said bight portion and a second long leg portion being relatively longer than said first short leg portion and extending rearwardly in close proximity to the other edge of said bight portion.

2. A metal enclosed switchgear unit as claimed in claim 1 wherein a plurality of enclosures for housing circuit breakers are formed in the front of said rectangular section and a plurality of electrical circuit breakers are supported in said enclosures and are electrically connected to said vertical risers.

3. A metal enclosed switchgear unit as claimed in claim 1 wherein said connector means comprises a bight portion having a rear facing flat surface, a first short leg portion extending forward in close proximity to one end of said bight portion and a second long leg portion extending forward in close proximity to the other end of said bight portion, said rear facing flat surface being connected to said horizontal through bus and said first forward extending short leg portion and said second forward extending long leg portion being connected to said vertical section bus.

4. A metal enclosed switchgear unit as claimed in claim 1, wherein said front facing flat surface of each vertical riser includes a plurality of evenly spaced holes therein facing the front of said switchgear unit.

5. A metal enclosed switchgear unit as claimed in claim 1, wherein said second long leg portion of said vertical riser is at least twice as long as said first short leg portion of said vertical riser.

6. A metal enclosed switchgear unit as claimed in claim 2, wherein the cross-sectional area of each of said connector means is substantially equal to the cross-sectional area of each of said vertical section bus.

7. A metal enclosed switchgear unit as claimed in claim 6, wherein the length of each of said connector means is substantially equal to the width of each of said horizontally extending main through bus bar conductors.

8. A metal enclosed switchgear unit comprising three horizontally extending main through bus bar conductors disposed horizontally in a spaced apart relationship in said switchgear unit;
three vertical risers disposed in said switchgear unit in front of said main horizontal through bus bar conductors;
connector means electrically connecting each phase of said horizontal main through bus conductors to its associated vertical riser; and
each of said vertical risers comprising a generally J-shaped cross-sectional area.

* * * * *